April 29, 1941.   B. STÅLHANE   2,240,231
PRODUCTION OF ALLOYS OF CHROMIUM AND SIMILAR METALS
Filed Dec. 26, 1939
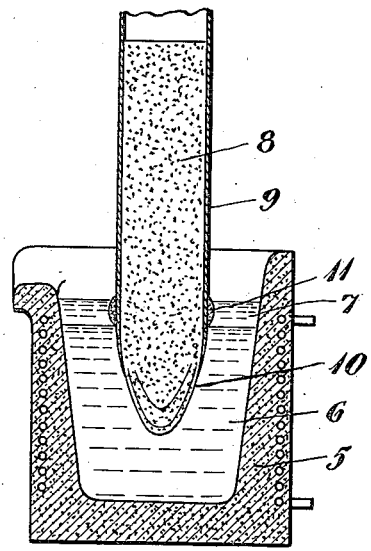
Inventor,
Bertil Stålhane
By: Henry C. Parker
Attorney Patented Apr. 29, 1941

2,240,231

UNITED STATES PATENT OFFICE 2,240,231

PRODUCTION OF ALLOYS OF CHROMIUM AND SIMILAR METALS

Bertil Stålhane, Stockholm, Sweden

Application December 26, 1939, Serial No. 311,015
In Sweden January 19, 1939

9 Claims. (Cl. 75—10)

The present invention relates to the production of alloys, particularly ferro alloys, of chromium, molybdenum, tungsten and manganese. More particularly the invention relates to a novel method of producing alloys of the said metals by reduction of a material, which is rich in the corresponding oxide, by means of silicon or reducing agents containing silicon, such as ferro-silicon, silicon calcium or silicon aluminium.

The novel method forming the subject matter of the present application is of particular interest in connection with the production of ferro-chromium or chromium alloys by reduction of materials which are rich in chromium oxide, such as chromium ore (ferro-chromite) or slags containing a high percentage of chromium oxide, and the method will therefore be explained in the following with reference to the production of such alloys only. I wish it to be understood, however, that my novel method may be applied with equal advantage for the production of ferro-molybdenum and other molybdenum alloys as well as for the production of tungsten and manganese alloys.

Theoretically the conditions encountered in the reduction of a material, which is rich in chromium oxide, by means of silicon or ferro-silicon containing a high percentage of silicon are very favourable, because the reaction, which leads to the formation of chromium or ferro-chromium metal and silica or silicate slag respectively, by itself produces so much heat that the reaction mass need be heated to reaction temperature only, i. e. to some 1100 or 1200° centigrade, in order to initiate the process. The reaction heat thereafter raises the temperature further, so that metal and slag are obtained in molten form. Preferably the reaction mixture is supplied successively to an already molten metal bath, for example in an electric furnace, the bath then heating the reaction mixture so that the reaction is initiated, the ferro-chromium formed during the reaction being taken up by the metal bath and the slag collected on the surface of the bath.

Particularly suitable for use with the said process are electric high frequency induction furnaces, since such furnaces permit of a high power supply to the metal bath even when the dimensions of the furnace are rather small and since, furthermore, their use involves the elimination of every risk for an increase of the carbon contents through the influence of combustion gases or electrodes. Because of the high temperature necessary for the carrying out of a chromium producing process, i. e. a temperature above 1700° C., if a high percentage of chromium is desired in the final product, the furnace lining must be made from a highly refractory basic material, for example a material having magnesite as the main constituent. An acid lining of quartz has too low a melting point, namely below 1700° centigrade.

Hitherto known methods for the reduction of chromium ore with silicon or silicon alloys have given results, however, which are unsatisfactory in several respects. On the one hand the heat transmission from the metal bath to the reaction mass and the speed of the reaction in the mass have been small, resulting in a low production, while on the other hand the consumption of silicon has been great and the yield of chromium small because of the oxidation of silicon and already reduced chromium which occurs due to the fact that considerable amounts of atmospheric air penetrate through the porous charge. In order to secure a reasonably satisfactory yield of chromium one has therefore hitherto been compelled to work with a rather high excess of silicon, in which case it becomes difficult to avoid a residual percentage of silicon in the ferro-chromium product, so that under certain conditions a subsequent refining of the product with an oxidizing slag becomes necessary.

Furthermore, difficulties have been encountered in the obtaining of a lining of sufficient strength, in that the silica formed during the reaction has severely attacked the basic lining.

Attempts have been made to avoid said difficulties by working with a pulverized and intimately mixed charge, for instance in the form of briquettes, and by adding some lime which binds the silica formed in the reaction to a silicate slag. Hereby the yield of chromium is increased in that the speed of reaction becomes greater and the tendency to the burning off of chromium smaller. Furthermore, the attack on the furnace lining becomes less vigorous.

In spite of such measures as have been set forth above, however, one has hitherto had a low yield of chromium, a great consumption of silicon, a great percentage of silicon in the final product, and an unsatisfactory strength of the furnace lining, these factors rendering the economy of the process less favourable.

An explanation of the unfavourable results may be found in the fact that generally the reaction mixture has been supplied at points above the surface of the metal bath in induction furnaces, so that the main part of the reaction has taken place above the metal bath in a layer of the charge, which has reached the reaction temperature but which has not yet become molten. When the reaction is initiated in a certain layer, a temperature rise occurs in the mass which possibly causes the mass to melt. The separation between the newly formed metal which, should be taken up by the metal bath, and the slag, which should collect on top of the metal bath, will thus take place in a half-molten layer of the mass which is subjected to cooling from above. The separating process thus takes place under unfavourable conditions with incomplete reduction and considerable burning off of the metal through oxidation by the air. Fundamentally, this is true whether the charge is supplied in the form of a powder or in the shape of pieces, for example in the form of briquettes.

The present invention has for its object to eliminate the said inconveniences encountered in the production of ferro-chromium by reduction of a material, which is rich in chromium oxide, with a reducing agent containing silicon in a high-frequency induction furnace. With said and other objects in view a method has been worked out, according to the invention, which is substantially characterized therein that a charge is produced by pulverizing and intimately mixing the material, which is rich in the oxide, with the silicon containing reducing agent and an amount of lime considerably exceeding the one which corresponds to 1 mol calcium oxide (CaO) to 1 mol silicon (Si) in the reducing agent containing silicon, and that said charge is shaped to form a vertical or inclined coherent rod or column consisting of coherent pieces of the charge, whereupon the lower end of the rod or column is pushed down under the surface of an overheated bath of molten metal contained in the induction furnace, so that at the said lower end the charge is caused to react and melt, the rod or column being fed down into the bath in its longitudinal direction according as the melting off of the rod takes place. Sometimes it is then advantageous to feed down two or more such rods or columns simultaneously under the surface of the metal bath.

It is thus a characterized feature of the present invention that the process takes place in an induction furnace having a basic lining, that the charge in the form of a rod or column is forced down at an angle to the horizontal under the surface of the metal bath, and that the amount of lime is so great that the slag formed gets a basic character.

My invention can be explained in more detail by reference to the accompanying drawing. The figure in this drawing shows, more or less diagrammatically, one of the preferred embodiments of my invention in which an induction furnace is employed which furnace is fed by means of a vertical column of reaction materials enclosed in a metal sheath. The crucible type furnace shown at 5 may be cylindrical, conical or of some other suitable shape. The metal bath 6 is covered by a layer of slag 7, through which the charge 8 is introduced under the surface of the metal bath in the form of a rod or column, which in the shown example has been produced by stamping the material of the charge into a sheet metal covering 9 which follows the charge during its downward movement and which is successively lengthened at its upper end. The reaction and the melting off takes place at the lower end surface 10 of the rod within the metal bath and the rod is fed down little by little, so that its lower end will always occupy a position at a considerable depth under the surface of the metal bath. Because of the fact that new material must be heated continuously, the temperature rise in the mass will be limited to a comparatively insignificant depth under the surface of the rod, particularly since the heat conducting capacity of the pulverized reaction mixture is rather small. Where the rod passes through the layer of slag there will even take place a certain freezing out of the slag at 11, the solidified slag melting away, however, when it is forced down into the metal bath together with the rod. On the other hand, the transmission of heat from the metal bath to the surface of the rod 10 is very good, in that a sufficient amount of electric energy is supplied to the bath to keep the metal at a suitable excess temperature. According as the end of the rod melts away a new surface layer will therefore be subjected to the reaction temperature. The layer of molten slag, which may separate the still unmolten charge at the lower end surface of the rod from the molten metal, is in this case exceedingly thin, depending among other things on the upward pressure which the metal exerts on the surface of the rod on account of the difference in specific weight between the molten metal, and the charge and slag, respectively.

The metal and slag formed as a result of the reaction are thus separated under the surface of the metal bath. The newly formed metal is immediately taken up by the bath and the slag flows through the metal up to the layer of slag 7, which forms a protective covering over the metal bath that prevents the burning off of the metal. There will be no access of air to that part of the charge which has reached reaction temperature, i. e. the surface layer of the lower end of the rod, because said part is surrounded by the metal bath.

The importance of the ample admixture of lime in the charge, corresponding to more than 1½ mols of CaO per 1 mol of Si in the reducing agent containing silicon, has not previously been realized. Provided that the introduction of the charge into the metal bath takes place according to the present invention there will be obtained, it is true, a considerable improvement with respect both to the yield of chromium and to the durability of the lining even if the addition of lime amounts only to, for instance, 1 mol CaO to 1 mol Si or SiO₂ respectively. Because of the fact that the reaction, in which silicon (Si) is oxidized to silica (SiO₂), is localized to the end surface of the rod-shaped charge within the metal bath, and because the intimate mixture of the constituents of the charge results in an immediate formation of slag from silica, lime and residual chromium oxide, it is avoided that the lining is subjected to attack by free silica.

However, even a slag containing 1 mol CaO to 1 mol SiO₂ vigorously attacks a basic lining, for example magnesite, particularly at the high temperatures prevailing in this instance. It is therefore necessary to use more than 1½ mols CaO, for example 2 mols CaO, to 1 mol Si or SiO₂, respectively, so that a basic slag is formed immediately during the reaction in the charge. Only in this manner the attack of the slag on the lining is reduced considerably, so that the strength and durability of the lining becomes satisfactory. A contributing cause of said favourable result is also, as has been set forth in the foregoing, that no forced movement of the bath is required to carry through rapidly the process according to the invention. At the same time the yield of chromium or other metal is increased through an advantageous displacement of the equilibrium between the contents of silicon in the metal and the residual chromium oxide or other oxide in the slag on account of the influence of the lime.

As regards ferro chromite ores one must generally count with a certain content of magnesium oxide (MgO) which in itself is capable of binding silica to silicate. However, the contents of magnesia in the ore are generally already compensated for by alumina (aluminic oxide, $Al_2O_3$), which in this connection must be considered as an acid constitutent of the slag, wherefore the addition of lime referred to above is necessary also in this case. Similar conditions prevail in the working of slags which are rich in chromium oxide, in that in such slags the lime is already combined with silica and alumina.

When using silicon calcium as a reducing agent there is formed during the reaction a certain amount of calcium oxide which binds a corresponding amount of the silica formed at the same time. Since the use of silicon calcium containing a high percentage of calcium as a reducing agent in place of ferro silicon makes the process more expensive and, furthermore, lowers the temperature necessary to initiate the reaction which, as a matter of fact, is not advantageous for the proper working of the process, one can in practice only reckon with the compensation of a slight portion of the silica by means of calcium oxide formed from added calcium. When using, for instance, silicon calcium containing 20% calcium and 70% silicon, said compensation corresponds to less than 15% of the necessary amount of lime, provided that it is desired that more than 1½ mols of calcium oxide should be present to 1 mol of silica. Also in this case it is therefore necessary to use the ample addition of lime to the charge stated above.

On account of the simultaneous use of the particular method for introducing the charge below the surface of the metal bath and the ample supply of lime which is characteristic of the present invention, the advantageous properties of the induction furnace will be fully utilized during the process. The speed of reaction and the production will be great, the attack on the lining will be considerably reduced and the yield of chromium or other metal will be high even if the amount of silicon is so determined that the percentage of silicon in the final product becomes low.

It is evident that the idea of the invention may find application in several different embodiments with regard to the type of furnace used and the method for the introduction of the charge into the metal bath. As indicated above, it is not necessary to pack the charge together so as to form a coherent rod, for example in a sheet metal covering consisting or iron or a suitable chromium or other alloy. Another method of using the principle of the process is to pile successively on top of each other pieces of the charge, for instance consisting of cylindrical briquettes, so as to form a column which is fed into the metal bath guided in a suitable manner above the surface of the bath, for instance in a stationary sleeve. It is also possible to provide the form pieces with a single central aperture and thread the pieces onto a rod or tube of metal which follows the charge, whereby the column becomes more rigid. The form pieces may also consist of a charge mixture enclosed in parcels or pots of thin sheet metal. It should be particularly noted that the stresses are very insignificant. The upward pressure from the portion of the charge which is positioned under the surface of the metal bath may be generally counterbalanced by the weight of the charge above the surface of the metal.

Obviously, two or more charge columns may be fed into the same furnace simultaneously.

The dimensions of the charge column may be varied considerably. Yet it will be advantageous to work with a diameter which is greater than 200 millimeters. Otherwise the cost of transforming the charge to rods will become disproportionally great. In case a sheet metal covering, a central rod or a sheet metal packing is employed, which is melted down together with the charge, the influence of said reinforcing materials would become proportionately more apparent in the final product if the cross sectional area of the rod or column were small.

The charge material should, as already mentioned, be pulverized, particularly to particle sizes smaller than .5 millimeter.

The composition of the charge may be varied, the composition depending for instance on the composition of the chromium oxide containing material or other starting material which is to be reduced. The lime should mainly be added in the form of quick-lime, CaO, but in order to improve the properties of the charge a portion thereof may also be added in the form of hydrated lime, $Ca(OH)_2$, and lime-stone, $CaCO_3$.

The gases which are liberated upon the heating of such a charge, i. e. steam, carbon dioxide etc. may escape through the porous unmelted charge in the charge column without disturbing the melting process in the metal bath. In case the charge is packed into a sheet metal sleeve, the latter should be perforated to permit of the escape of the gases without considerable resistance.

Since the basic slag formed in the reaction, which slag also contains for instance chromium oxide, is rather viscous, it may be found necessary to introduce additions of clay, fluor-spar or the like. Said fluxing agents, however, are supplied directly to the layer of slag on top of the bath in order to prevent freezing of the slag.

As an example of a suitable charge for producing a chromium according to the invention may be mentioned a mixture, pulverized to particle sizes less than .5 millimeter and consisting of 100 parts by weight of chromium ore containing 50% of $Cr_2O_3$ and 15% of FeO, 18 parts by weight of ferro silicon containing 90% of Si, and 60 parts of quick-lime, which corresponds to about 1.8 mols of CaO pro 1 mol of Si in the ferro silicon. The mixture is packed into a cylindrical sleeve of sheet iron having a wall thickness of .5 to .7 millimeter and a diameter of 300 millimeters. A slight amount of the quick-lime may be replaced by an equivalent amount of hydrated lime or lime-stone. A small addition of finely pulverized clay may also be advantageous. The packing is facilitated if the pulverized charge is moistened with a liquid which, in order not to react with the quick-lime, should be almost free from water and which, furthermore, evaporates without leaving any residue containing carbon, for example alcohol.

If the temperature of the metal bath is kept above 1700° centrigrade and the operating conditions are suitable in other respects it is possible to obtain from such a charge ferro chromium containing more than 60% Cr, less than 1% Si and very little carbon.

The operations may be intermittent or more or less continuous. In the first case one starts with a metal bath having a comparatively small volume, a "sump," into which the charge is fed until the surface of the metal bath has risen to a suitable high level. Thereafter the charge column is removed, whereupon the newly formed metal is tapped off. Only so much metal is left that the process can be started anew. In the latter case, which is concerned primarily with comparatively large furnace units, only a small portion of the total amount of metal is drawn off in such a manner that the charge column need not be removed. This is possible if the drawing off of the metal is effected while tilting the furnace only slightly or by opening up at each time a bung-hole in the furnace at a comparatively high level, preferably above the current carrying spiral in the induction furnace.

I claim:

1. In the manufacture of metals and alloys containing chromium, molybdenum, tungsten, manganese and the like wherein an oxide of such a metal is reduced to metal by reaction with a metallic reducing agent, the process which comprises pulverizing and mixing together a material rich in the oxide of the metal to be produced and a metallic reducing agent, forming the resulting mixture into a coherent column, introducing one end of said column into a bath of molten metal maintained at a temperature sufficiently high to produce a reaction between said metal oxide and said reducing agent, said column being introduced beneath the surface of said molten metal, and feeding said column downwardly into said bath as it is consumed, whereby the molten metal obtained as a result of the reaction between said metallic oxide and said reducing agent becomes part of said metal bath while the slag formed rises to the surface of the bath.

2. The process of claim 1 wherein said metallic reducing agent is selected from a class consisting of silicon, ferro-silicon, silicon-calcium and silicon-aluminum.

3. The process of claim 1 wherein said metal bath is heated electrically by means of high-frequency induction currents.

4. The process of claim 1 wherein said metal oxide and said metallic reducing agent are pulverized to a particle size below 0.5 mm.

5. The process of claim 1 wherein said column has a diameter not substantially less than 200 mm.

6. In the manufacture of metals and alloys containing chromium, molybdenum, tungsten, manganese and the like wherein an oxide of such a metal is reduced to metal by reaction with a metallic reducing agent, the process which comprises pulverizing and mixing together a material rich in the oxide of the metal to be produced, a metallic reducing agent and sufficient basic slag-forming material to produce a basic slag, forming the resulting mixture into a coherent column, introducing said column into an induction furnace of the crucible type having a basic lining and containing a bath of molten metal maintained by means of high-frequency induction currents at a temperature sufficiently high to produce a reaction between said metal oxide and metallic reducing agent, the said column being introduced beneath the surface of said molten metal, and feeding said column downwardly into said bath as it is consumed, whereby the resulting molten metal becomes part of said metal bath while the basic slag-forming material rises to the surface of the bath to form a basic slag.

7. In the manufacture of metals and alloys containing chromium, molybdenum, tungsten, manganese and the like wherein an oxide of such a metal is reduced to metal by reaction with a metallic reducing agent, the process which comprises pulverizing and mixing together a material rich in the oxide of the metal to be produced, a metallic reducing agent containing silicon and a quantity of lime sufficient to produce a molecular ratio of CaO to Si of at least 1 to 1, compacting the resulting mixture into the form of a coherent column, introducing said column into an induction furnace of the crucible type having a basic lining and containing a bath of molten metal heated by means of induction currents to a temperature sufficient to produce a reaction between said metal oxide and said metallic reducing agent, the said column being introduced beneath the surface of said molten metal, and feeding said electrode into said metal bath as it is consumed whereby the molten metal resulting from said reaction becomes part of said metal bath while the basic slag formed rises to the surface of the bath.

8. In the manufacture of metals and alloys containing chromium, molybdenum, tungsten, manganese and the like wherein an oxide of such a metal is reduced to metal by reaction with a metallic reducing agent, the process which comprises pulverizing and mixing together a material rich in the oxide of the metal to be produced, a metallic reducing agent containing silicon and a quantity of lime sufficient to produce a molecular ratio of CaO to Si of at least 1 to 1, compacting the resulting mixture into the form of a coherent column, introducing one end of said column into a bath of molten metal heated to a temperature sufficient to cause the reaction between said metal oxide and said metallic reducing agent, the said column being introduced beneath the surface of said molten metal, and feeding said electrode into said metal bath as it is consumed whereby the molten metal resulting from said reaction becomes part of said metal bath while the basic slag formed rises to the surface of the bath.

9. The process of claim 8 wherein the moleculuar ratio of CaO to Si is at least 1½ to 1.

BERTIL STÅLHANE.